Dec. 9, 1969 F. C. BOLICK, JR 3,482,751
TAPE MOTION DEVICE
Filed April 10, 1968 2 Sheets-Sheet 1
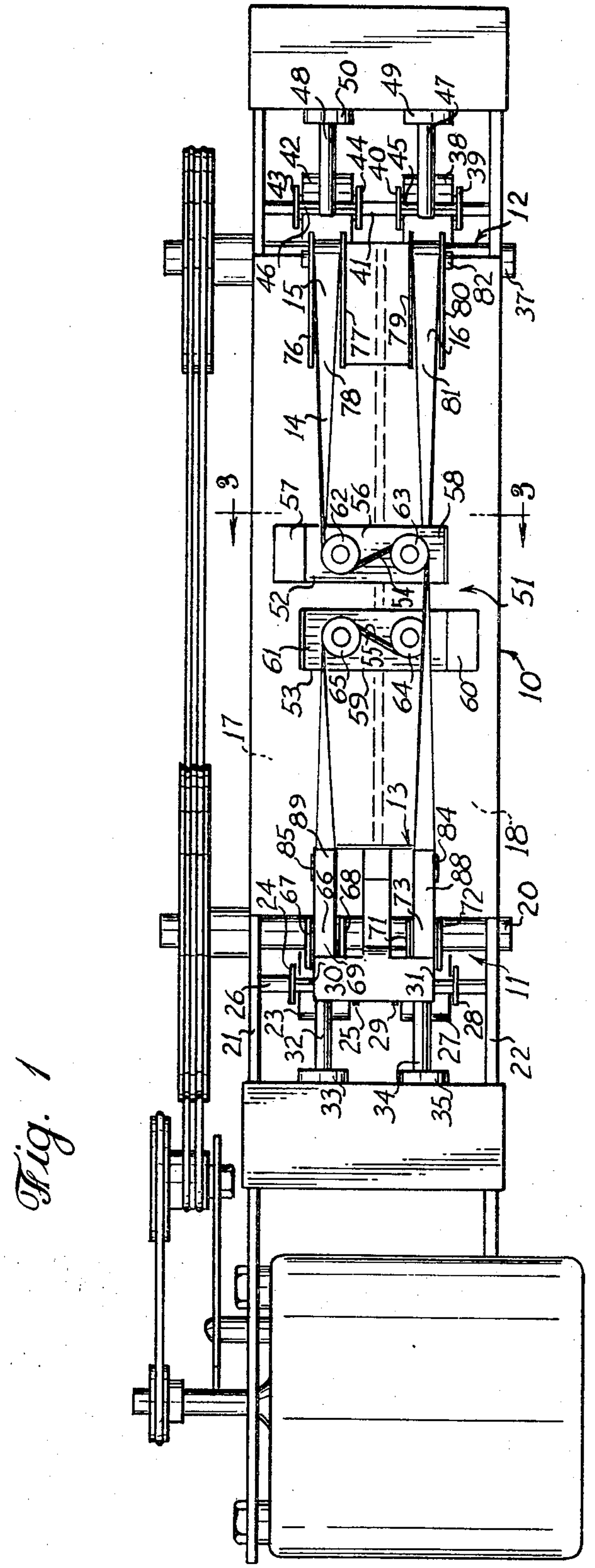
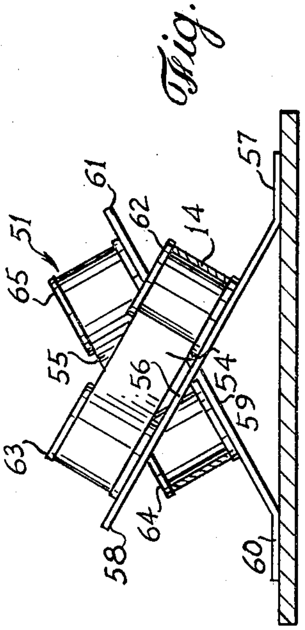
Fig. 3
INVENTOR.
Fred C. Bolick, Jr.
BY
Jones & Thomas
ATTORNEYS Dec. 9, 1969 F. C. BOLICK, JR 3,482,751

TAPE MOTION DEVICE

Filed April 10, 1968 2 Sheets-Sheet 2

INVENTOR
Fred C. Bolick, Jr.
BY
Jones & Thomas
ATTORNEYS

1

3,482,751

TAPE MOTION DEVICE

Fred C. Bolick, Jr., Atlanta, Ga., assignor to Lanier Electronic Laboratory, Inc., Atlanta, Ga., a corporation of Georgia Filed Apr. 10, 1968, Ser. No. 720,226
Int. Cl. B65h 23/00, 17/48; G11b 15/28
U.S. Cl. 226—50 10 Claims

ABSTRACT OF THE DISCLOSURE

What is disclosed is a tape motion device for controlling the motion of a tape in two directions along a first tape path and a second tape path through a recording-reproducing zone and which includes a displacing means for laterally transposing the two tape paths within the zone while at the same time maintaining generally corresponding portions of the two tape paths in common horizontal planes of motion. The tape motion device also includes a first guiding means and a second guiding means for guiding tape in the two paths by forming a plurality of channels in which tape moves.

BACKGROUND OF THE INVENTION

Field of the invention

This invention relates to tape motion devices and more particularly to a tape motion device for recording-reproducing equipment in which an endless magnetic tape is used in the recording, storing and transcribing of information.

Description of the prior art

In recording-reproducing equipment in which an endless magnetic tape is used in the recording, storing and transcribing of information, it is customary to store the tape subsequent to the recording of information on the tape and prior to the transcribing of information from the tape in a recorded tape magazine and to store the tape subsequent to the transcribing of information from the tape and prior to the recording of information on the tape in a separate transcribed tape magazine. The function of recording information on the tape is accomplished by transferring the tape with a recording motion from the transcribed tape magazine to the recorded tape magazine through a recording-reproducing zone in which recording of information occurs. Similarly, the function of transcribing information from the tape is accomplished by transferring the tape with a transcribing motion from the recorded tape magazine to the transcribed tape magazine through the recording-reproducing zone in which the transcribing of information also occurs.

Thus, an essential device in recording-reproducing equipment of this type is a tape motion device to provide for both a recording motion and a transcribing motion of the tape between tape magazines through the recording-reproducing zone. Moreover, in addition to providing these two tape motions, a tape motion device must provide for two opposite motions of the tape. One of these opposite motions of the tape is a recording-review motion which is opposite to the recording motion of the tape so as to provide for review of previously recorded information during subsequent recording motion of the tape. The other of these opposite motions is a transcribing review motion which is opposite to the transcribing motion of the tape so as to provide for review of previously transcribed information during subsequent transcribing motion of the tape.

The most convenient arrangement for a transcribed tape magazine and a recorded tape magazine is a side-by-side

2 arrangement and this arrangement of the tape magazines and the requirement that a tape motion device provide four tape motions have resulted in a variety of tape motion devices being used in the prior art. Among the best of these prior art tape motion devices is that disclosed in U.S. Patent No. 3,347,432 issued on Oct. 17, 1967, to Fred C. Bolick, Jr., for an "Endless Tape Control Device." A tape control device similar to that disclosed in U.S. Patent No. 3,347,432 has also been used in recording-reproducing equipment by Nye Products, Inc., 3806 Woodland Park Ave. N., Seattle, Wash.

These two tape motion devices are among the best of the prior art tape motion devices in that both of these tape motion devices transfer tape between a recorded tape magazine and a transcribed tape magazine through a recording-reproducing zone with a single tape driving means being used for both recording motion and transcribing motion of the tape and with a second tape driving means being used for both recording review motion and transcribing review motion of the tape. The use of a single tape driving means to provide both recording motion and transcribing motion of a tape insures that both of these motions of the tape are always at the same speed so that there is no distortion of recorded information on the tape during transcribing while at the same time avoiding any requirements for careful coordination of one tape driving means with another tape driving means.

The use of a second tape driving means to provide both recording review motion and transcribing review motion in these prior art tape motion devices insures that both of these motions are independent of recording motion and transcribing motion. Thus, recording review motion and transcribing review motion may be at speeds which are most efficient without the use of a relatively expensive to maintain and manufacture variable speed mechanism.

In both of these two prior art motion devices, the tape must have two tape paths through the recording-reproducing zone and these two tape paths must cross each other within the recording-reproducing zone.

This required crossing of the tape in the tape paths has caused problems in maintaining the tape in alignment as it is fed through the recording-reproducing zone toward and away from a tape driving means.

In the tape motion device used by Nye Products, Inc. this problem is the result of the tape in one path simply crossing the tape in another path within the recording-reproducing zone so that the tape in each path passes toward and away from a tape driving means at an angle to the axis of rotation of the tape driving means. Moreover, this tape motion device has an additional problem in that the crossing of the tape in the recording-reproducing zone causes frictional resistance to tape motion and excessive wearing of the tape.

In the tape motion device disclosed in U.S. Patent No. 3,347,432, the problem with maintaining the tape in alignment has been encountered even though this tape motion device includes a displacing means for separating the tape in the two tape paths within the recording-reproducing zone and for aligning the tape as it passes toward and away from a tape driving means because the displacing means twists the tape about its lengthwise axis within the recording-reproducing zone. This tape motion device also has an additional problem in that the displacing means causes the two tape paths to be displaced vertically from each other as the two tape paths pass toward and away from a tape driving means. This causes the tape in one of the tape paths to pass a substantial vertical distance from the tape path to a common driving shaft for tape in both tape paths with the result that there is some inertia in the tape motion. Moreover, the displacing means requires relatively large amounts of space and is relatively expensive to manufacture and difficult to maintain.

SUMMARY OF THE INVENTION

The invention disclosed herein overcomes these and other problems encountered with prior art tape motion devices in that it provides a tape motion device in which the alignment of the tape as it is fed through a recording-reproducing zone toward and away from a tape driving means is maintained even though the tape passes through the recording-reproducing zone in two paths which cross each other within the recording-reporducing zone. Moreover, the invention provides a tape motion device in which the two tape paths are displaced from each other in the recording-reproducing zone so as to avoid frictional resistance to tape motion and excessive wearing of the tape while at the same time placing the two tape paths in a common horizontal plane of motion as the two tape paths move toward and away from a tape driving means so as to avoid a substantial vertical distance from a tape path to a common driving shaft and the resulting inertia in the tape motion. Moreover, the invention provides a tape motion device having a displacing means for displacing the tape paths in a recording-reproducing zone which requires only a relatively small amount of space and which is relatively inexpensive to manufacture and easy to maintain. Finally, the invention provides these improvements in a tape motion device while providing all of the advantages of a tape motion device disclosed in U.S. Patent No. 3,347,432.

These improvements in a tape motion device are provided by a tape motion device having a first tape driving means for moving the tape through a recording-reproducing zone toward a first tape magazine along a first tape path and for separately and independently moving the tape through the recording-reproducing zone toward a second tape magazine along a second tape path which traverses the first tape path within the recording-reproducing zone, a second tape driving means spaced from the first tape driving means for moving the tape through the recording-reproducing zone toward the second tape magazine along the first tape path and for separately and independently moving the tape through the recording-reproducing zone toward the first tape magazine along the second tape path, and displacing means for laterally transposing the first tape path and the second tape path within the recording-reproducing zone by placing the tape in laterally extending inclined segments while at the same time maintaining the first tape path and the second tape path in common horizontal planes of motion as they pass toward and away from the first tape driving means and the second tape driving means. In addition, the tape motion device has a first guiding means adjacent to the first tape driving means for guiding tape in the first tape path and in the second tape path as the tape passes toward and away from the first tape driving means, and a second guiding means for guiding the tape in the first tape path and the second tape path as the tape passes toward and away from the second tape driving means.

It is the displacing means which serves to provide a tape motion device in which tape in a first tape path crosses tape in a second tape path within a recording-reproducing zone without frictional resistance to tape motion resulting and without the tape in the first tape path being vertically displaced from the tape in the second tape path as the two tape paths pass toward and away from a tape driving means. It is the displacing means in combination with the first guiding means and the second guiding means which serves to provide a tape motion device in which the tape in the first tape path and the tape in the second tape path always remain in alignment relative to the first tape driving means and the second tape driving means. Finally, it is the relative simplicity of the displacing means which serves to provide a displacing means which is relatively inexpensive to manufacture and easy to maintain and which requires only a small amount of space in the recording-reproducing equipment with which the tape motion device is used.

BRIEF DESCRIPTION OF THE DRAWING

These and other features and advantages of the invention will be more clearly understood from the following detailed description and the accompanying drawing in which like characters of reference designate corresponding parts throughout and in which:

FIG. 1 is a top plan view of an embodiment of the invention;

FIG. 3 is a cross-sectional view of that embodiment of the invention shown in FIG. 2 taken in line 3—3 in FIG. 1 and with background detail omitted for clarity.

DESCRIPTION OF AN EMBODIMENT

Figure 2:
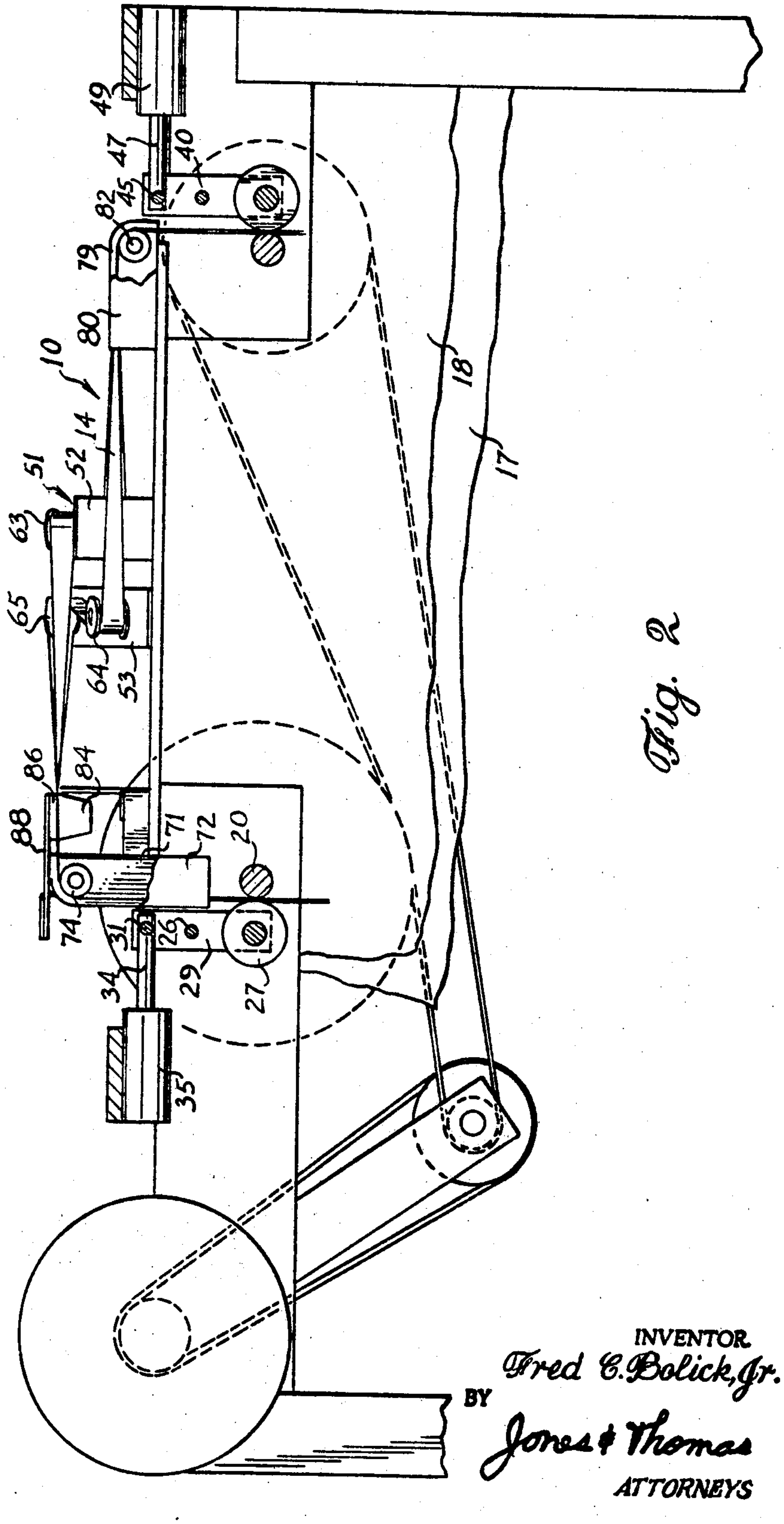
FIG. 2 is a side elevational view of that embodiment of the invention shown in FIG. 1 with a side member cut away to more clearly show the invention.

The foregoing described figures and the following detailed description disclose a specific embodiment of the invention. However, it will be understood that the invention is not limited to the details disclosed since the invention may be embodied in other equivalent forms.

The invention disclosed herein is most easily understood as a tape motion device 10 which includes a first tape driving means 11 and a second tape driving means 12 positioned at opposite ends of a recording-reproducing zone 13. A tape 14 extends between the first tape driving means 11 and the second tape driving means 12 through the recording-reproducing zone 13 in a first tape path 15 and in a second tape path 16 which traverses the first tape path 15. The first tape driving means 11 provides recording motion to the tape 14 in the first tape path 15 and transcribing motion to the tape 14 in the second tape path 16. Similarly, the second tape driving means 12 provides recording-review motion to the tape 14 in the first tape path 15 and transcribing review motion to the tape 14 in the second tape path 16.

It will be understood that when a recorded tape magazine 17 and a transcribed tape magazine 18 are arranged side-by-side as shown in FIG. 1, the traversing of the first tape path 15 by the second tape path 16 results in the tape being transferred back and forth between the recorded tape magazine 17 and the transcribed tape magazine 18 by the four motions of the tape 14 in substantially conventional manner. It is because of this that the tape magazines 17 and 18 are only generally shown. It is also because of this and because the operation of the tape motion device 10 will be understood by those skilled in the art once the invention is understood that the tape motion device 10 is shown alone without control circuits and other components customarily used in recording-reproducing equipment.

In that embodiment of the invention shown in the drawing, the first tape driving means 11 includes a rotating shaft 20 extending between a side member 21 and a side member 22 and a recording idler roller 23 rotatably mounted between plates 24 and 25 which are in turn pivotally mounted on a rod 26 extending between the side members 21 and 22 above the recording idler roller 23. The centerline of the rod 26 is parallel to the axis of rotation of the shaft 20 and the rod 26 serves to position the recording idler roller 23 adjacent to the shaft 20. The first tape driving means 11 also includes a transcribing idler roller 27 rotatably mounted between plates 28 and 29 which are pivotally mounted on the rod 26 adjacent the plates 24 and 25 so as to position the transcribing idler roller 27 adjacent the shaft 20 and laterally of the recording idler roller 23.

A yoke 30 is pivotally mounted between the plates 24 and 25 above the rod 26 and a yoke 31 is pivotally mounted between the plates 28 and 29 above the rod 26. A plunger 32 of a solenoid-plunger unit 33 is operatively connected to the yoke 30 and a plunger 34 of a solenoid-plunger unit 35 is operatively connected to the yoke 31 and it will be understood that the energizing of the solenoid-plunger unit 33 results in the recording idler roller 23 pivoting toward the shaft 20 and that the energizing of the solenoid-plunger unit 35 results in the transcribing idler roller 27 pivoting toward the shaft 20. Thus, when the tape 14 in the first tape path 15 is positioned between the shaft 20 and the recording idler roller 23 and the tape 14 in the second tape path 16 is positioned between the shaft 20 and the transcribing idler roller 27, the energizing of either or both the solenoid-plunger unit 33 or the solenoid-plunger unit 35 causes motion of the tape 14 in a direction determined by the rotation of the shaft 20.

Similar to the first tape driving means 11, the second tape driving means 12 includes a rotating shaft 37 which extends between the side member 21 and the side member 22 and a recording-review idler roller 38 rotatably mounted between plates 39 and 40 which are in turn pivotally mounted on a rod 41 extending between the side member 21 and the side member 22 above the recording-review idler roller 38. The centerline of the rod 41 is parallel to the axis of rotation of the shaft 37 and serves to position the recording-review idler roller 38 adjacent the shaft 37. The second tape driving means 12 also includes a transcribing-review idler roller 42 rotatably mounted between plates 43 and 44 which are pivotally mounted on the rod 41 adjacent the plates 39 and 40 so as to position the transcribing-review idler roller 42 adjacent the shaft 37 and laterally of the recording-review idler roller 38.

Yokes 45 and 46 are pivotally mounted between the plates 39 and 40 and the plates 43 and 44 respectively and are operatively connected to plungers 47 and 48 of solenoid-plunger units 49 and 50 respectively. Thus, it wil be understood that as with the first tape driving means 11, the second tape driving means 12 is operative in response to the energizing of the solenoid-plunger units 49 and 50 to provide motion of the tape 14 in the first tape path 15 and in the second tape path 16.

The shaft 20 and the shaft 37 are substantially parallel to each other and it will also be understood that the tape 14 passes through the recording-reproducing zone 13 as it moves in the first tape path 15 and in the second tape path 16 between the first tape driving means 11 and the second tape driving means 12. In addition, it will be understood that the recording idler roller 23 is positioned above the recorded tape magazine 17 and the recording-review idler roller 38 is positioned above the transcribed tape magazine 18. Similarly, the transcribing idler roller 27 is positioned above the transcribed tape magazine 18 and the transcribing-review idler roller 42 is positioned above the recorded tape magazine 17. Thus, the arrangement of the idler rollers 23, 27, 38, and 42 and of tape paths 15 and 16 is such as to cause the tape 14 to be transferred between tape magazines 17 and 18 in substantially conventional manner.

Positioned within the recording-reproducing zone 13 between the first tape driving means 11 and the second tape driving means 12 is a displacing means 51 for displacing tape 14 in the tape paths 15 and 16 while at the same time maintaining the first path 15 and the second path 16 in common horizontal planes of motion as they pass toward and away from the first tape driving means 11 and the second tape driving means 12. In that embodiment of the invention disclosed herein, the displacing means 51 includes a first inclined motion means 52 and a second inclined motion means 53 for guiding the tape 14 in the first tape path 15 and in the second tape path 16 respectively into laterally and vertically inclined path segments 54 and 55 which are disposed substantially perpendicular to the general direction of the first tape path 15 and the second tape path 16 through the recording-reproducing zone 13. Specifically, the first inclined motion means 52 includes a bracket member 56 having a tab portion 57 positioned above the transcribed tape magazine 18 and a support portion 58 inclined upwardly and laterally from the tab portion 57 over the recorded tape magazine 17 and the second inclined motion means 53 includes a bracket member 59 having a tab portion 60 positioned above the recorded tape magazine 17 and a support portion 61 inclined upwardly and laterally from the tab portion 60 over the transcribed tape magazine 18.

Mounted along the length of the support portion 58 for rotation about axes substantially perpendicular to the support portion 58 are a first lower spool 62 and a first upper spool 63, similarly, mounted along the length of the support portion 61 for rotation about axes substantially perpendicular to the support portion 61 are a second lower spool 64 and a second upper spool 65.

It will be understood from FIGS. 1 and 3 that the spools 62, 63, 64 and 65 of the displacing means 51 are positioned within the recording-reproducing zone 13 so that tape 14 in the first tape path 15 extends from the first tape driving means 11 to and around the first upper spool 63, thence laterally and downwardly in the inclined path segment 54 to the first lower spool 62, thence around the first lower spool 62 and to the second tape driving means 12. Similarly, tape 14 in the second tape path 16 extends from the first tape driving unit 11 to and around the second upper spool 65, thence laterally and downwardly in the inclined path segment 55 to the second lower spool 64, thence around the second lower spool 64 to the second tape driving means 12.

Furthermore, it will be understood from FIGS. 1 and 2 that the inclined path segments 54 and 55 of the tape paths 15 and 16 serve to laterally transpose the tape paths 15 and 16 within the recording-reproducing zone 13 without the tape 14 in a tape path 15 or 16 engaging the tape 14 in another tape path 15 or 16. Moreover, it will be understood that the inclined path segments 54 and 55 vertically displace the first tape path 15 and the second tape path 16 by substantially the same relatively small vertical distance so that the first tape path 15 and the second tape path 16 are in a single horizontal plane of motion as they pass toward and away from the first tape driving means 11 or the second tape driving means 12 even though there are two horizontal planes of motion which are vertically displaced from each other by the relatively small vertical distance.

Adjacent the first tape driving means 11 is a first guiding means 66 for guiding the tape 14 in the first tape path 15 into position between the shaft 20 and the recording idler roller 23 and the tape 14 in the second tape path 16 into position between shaft 20 and the transcribing idler roller 27. The first guiding means 66 includes a pair of parallel plates 67 and 68 positioned relative to each other to define a channel 69 above the shaft 20 and the recording idler roller 23 and a pair of parallel plates 71 and 72 positioned relative to each other to define a channel 73 above the shaft 20 and the transcribing idler roller 27.

A shaft 74 extends through the plates 67, 68, 71 and 72 with its centerline substantially parallel to the shaft 20 and the tape 14 in the first tape path 15 extends from the first upper spool 63 of the displacing means 51 to the channel 69 over the shaft 74 in the channel 69, and thence downward from the channel 69 to between the shaft 20 and recording idler roller 23. Similarly, the tape 14 in the second tape path 16 extends from the second upper spool 65 of the displacing means 51 to the channel 73, over the shaft 74 in the channel 73, and thence downwardly from the channel 73 to between the shaft 20 and the transcribing idler roller 27. Thus, the first guiding means 66 serves to provide channels 69 and 73 for maintaining the lateral position of the tape 14 in the first tape path 15 and in the second tape path 16 as the tape 14 moves in these tape paths 15 and 16 and toward and away from the first tape driving means 11.

A second guiding means 75 is positioned adjacent the second tape driving means 12 and is similar to the first guiding means 66 in that it includes a pair of parallel plates 76 and 77 positioned relative to each other to define a channel 78 above the shaft 37 and the recording-review idler roller 38 and a pair of parallel plates 79 and 80 positioned relative to each other to define a channel 81 above the shaft 37 and the transcribing-review idler roller 42. A shaft 82 extends through the plates 76, 77, 79 and 80 with its centerline substantially parallel to the shaft 37 and the tape 14 in the first tape path 15 extends from the first lower spool 62 of the displacing means 51 to the channel 78, over the shaft 82 in the channel 78, and thence downwardly from the channel 78 to between the shaft 37 and the recording review idler roller 38.

Similarly, the tape 14 in the second tape path 16 extends from the second lower spool 64 of the displacing means 51 to the channel 81, over the shaft 82 in the channel 81, and thence downwardly from the channel 81 to between the shaft 37 and the transcribing review idler roller 42. Thus, the second guiding means 75 serves to provide channels 78 and 81 for maintaining the lateral position of the tape 14 in the first tape path 15 and in the second tape path 16 as the tape 14 moves in these tape paths 15 and 16 toward and away from the second tape driving means 12.

The tape motion device 10 disclosed herein also includes a recording-listening head 84 positioned to operatively engage the tape 14 in the recording-reproducing zone 13 as the tape 14 moves in the first tape path 15 between the first tape driving means 11 and the second tape driving means 12. Similarly, a transcribing head 85 is arranged to operatively engage the tape 14 in the recording-reproducing zone 13 as the tape 14 moves in the second tape path 16 between the first tape driving means 11 and in the second tape driving means 12. To insure engagement of the tape 14 with the recording-listening head 84 and the transcribing head 85, the tape motion device 10 herein includes pad members 86 and 87 which are mounted on and urged downwardly by resilient arms 88 and 89 to force the tape 14 against the recording-listening head 84 and the transcribing head 85 respectively.

The operation of the tape motion device 10 will be understood by those skilled in the art from the foregoing description and from a consideration of U.S. Patent No. 3,347,432 which shows and describes components such as the motor 91 that are not described herein for the sake of brevity. However, even though the operation of the tape device 10 disclosed herein is similar to that of the tape device 10 disclosed in the U.S. Patent No. 3,347,432, it will now be understood that the displacing means 51 serves to laterally displace the first tape path 15 and the second tape path 16 relative to each other within the recording-reproducing zone 13 so that the tape paths 15 and 16 are laterally transposed without the tape 14 in one tape path 15 or 16 engaging the tape 14 in another tape path 15 or 16, while at the same time maintaining the tape paths 15 and 16 in common horizontal planes of motion as they pass toward and away from the first tape driving means 11 and the second tape driving means 12.

Similarly, it will now be understood that the displacing means 51 with the first guiding means 66 and the second guiding means 75 serves to insure that the tape 14 passes in the first tape path 15 and the second tape path 16 toward and away from the first tape driving means 11 and the second tape driving means 12 in directions of motion which are substantially perpendicular to the axis of rotation of the shafts 20 and 37 and which are substantially fixed in lateral position along the shafts 20 and 37. Finally, it will now be understood from a description of the displacing means 51 that the displacing means 51 provides a means for displacing the tape 14 which requires only a relatively small amount of space and which is relatively inexpensive to manufacture and easy to maintain.

It will be obvious to those skilled in the art that many variations may be made in the embodiment chosen for the purpose of illustrating the present invention.

What is claimed is:

1. In a tape motion device for controlling the motion of a tape in a recording-reproducing zone through which said tape is moved between a first tape magazine and second tape magazine positioned side-by-side adjacent said zone, first tape driving means for moving said tape through said zone toward said first tape magazine along a first path and for moving said tape through said zone toward said second tape magazine along a second path, second tape driving means spaced from said first tape driving means for moving said tape through said zone toward said second tape magazine along said first path and for moving said tape through said zone toward said first tape magazine along said second path, and displacing means for providing a segment of said first path within said zone which is inclined laterally and upwardly from over said first tape magazine to over said second tape magazine and for providing a segment of said second path which is inclined laterally and upwardly from over said second tape magazine to over said first tape magazine.

2. The tape motion device of claim 1 in which said segment of said first path and said segment of said second path are disposed substantially perpendicularly to a line of reference extending between said first tape driving means and said second tape driving means.

3. The tape motion device of claim 1 in which said displacing means laterally transposes said first path and said second path within said zone while maintaining corresponding portions of said first path and said second path in common horizontal planes of motion through said zone.

4. The tape motion device of claim 1 in which said segment of said first path and said segment of said second path are displaced from each other along a line of reference extending between said first tape driving means and said second tape driving means.

5. The tape motion device of claim 1 in which said displacing means includes a first inclined motion means for guiding a tape in said segment of said first path and a second inclined motion means for guiding a tape in said segment of said second path.

6. The tape motion device of claim 5 in which said first inclined motion means includes a support portion, a lower spool mounted on said support portion over said first tape magazine, and an upper spool mounted on said support member over said second tape magazine.

7. The tape motion device of claim 6 in which said second inclined motion means includes a second lower spool disposed laterally of said lower spool of said first inclined motion means, and a second upper spool disposed laterally of said upper spool of said first inclined motion means.

8. The tape motion device of claim 1 including a first guiding means for guiding a tape in said first path and a tape in said second path toward and away from said first tape driving means by forming a plurality of channels adjacent said first tape driving means.

9. The tape motion device of claim 8 including a second guiding means for guiding a tape in said first path and a tape in said second path toward and away from said second tape driving means by forming a plurality of channels adjacent said second tape driving means.

10. The tape motion device of claim 1 including means for forming a plurality of channels adjacent said first tape driving means and said second tape driving means for said tape.

References Cited

UNITED STATES PATENTS 3,347,432 10/1967 Bolick -------------- 226—50

M. HENSON WOOD, Jr., Primary Examiner

ELLIOTT A. KATZ, Assistant Examiner

U.S. Cl. X.R.

226—110